United States Patent [19]

Cherry

[11] 3,711,660

[45] Jan. 16, 1973

[54] HYBRID NETWORKS

[75] Inventor: Edward Moore Cherry, Victoria, Australia

[73] Assignee: Monash University, Victoria, Australia

[22] Filed: Dec. 1, 1970

[21] Appl. No.: 93,926

[30] Foreign Application Priority Data

Dec. 4, 1969 Australia ..........................64,792/69
March 26, 1970 Australia ........................PA0751/70

[52] U.S. Cl. ............179/170 NC, 179/81 A, 333/11, 333/75

[51] Int. Cl. ..............................................H04m 1/58

[58] Field of Search ..179/170 NC, 81 A; 333/11, 10; 323/75; 330/175

[56] References Cited

UNITED STATES PATENTS

| | | | |
|---|---|---|---|
| 3,479,468 | 11/1969 | Kretzmer | 179/170 NC |
| 3,440,367 | 4/1969 | Holtz | 179/81 A |
| 2,838,612 | 6/1958 | Pocock | 179/81 A |
| 2,988,712 | 6/1961 | Rhodes | 179/170 NC |
| 2,629,024 | 2/1953 | Edwards | 179/170 NC |

*Primary Examiner*—Ralph D. Blakeslee
*Assistant Examiner*—David L. Stewart
*Attorney*—Cushman, Darby & Cushman

[57] ABSTRACT

The disclosure of the present specification relates to a bridge network suitable for use as a telephone hybrid wherein the bridge network includes at least two bridge networks in cascade, one bridge having arms which include the input and bidirectional ports of the hybrid and the nominal balancing impedance, the other sub-bridge network having arms which include the output port of the hybrid and the output circuit of an amplifier having an output signal characterized by a product of the signal applied to the input port of the hybrid and the signal from the output of the hybrid, the output circuit thereby being isolated from arms in the output port and from all other arms of the bridge which include reactive elements or characteristics.

17 Claims, 8 Drawing Figures

HYBRID NETWORKS

This invention relates to "balanced" networks and more particularly, Although not exclusively, to an improved hybrid network which is capable of achieving acceptable balance conditions.

Hybrid networks are used extensively in telephone systems and comprise three ports: an input port, an output port and a bidirectional port. Two hybrid networks are required to set up many of the telephone conversations between subscribers not served by the same exchange. In such an arrangement each subscriber is connected to the bidirectional port of the related hybrid whilst the output port of each is connected to the input port of the other: one circuit carries the signal in one direction while the other circuit carries the signal in the other direction.

When it is balanced, a hybrid network simultaneously satisfies the following conditions:

a. a signal applied to the input port does flow out the bidirectional port;
b. a signal applied to the input port does not flow out the output port, and
c. a signal applied to the bidirectional port does flow out the output port.

The primary cause of imbalance in hybrid networks results from the lack of a constant relationship between the admittance of the two-wire circuit connected to the bidirectional port and the other admittances of the hybrid. If the hybrid is not balanced, as is usually the case, a signal applied to the input port appears at the output port and this will give rise to an echo in the following manner: If the hybrid connected to one subscriber is unbalanced then a signal from a calling subscriber is fed into the input of the unbalanced hybrid and some of this signal flows from the output port back to the calling subscriber so that this subscriber hears the returned signal. Now if the call is local and the propagation time too small to produce an audible separation between the direct and reflected components there is no problem. In fact the echo may be used to advantage to make the phone sound alive when it is used. If the call involves a moderate propagation delay, of the order of several tens of milliseconds, then echo becomes annoying to the subscriber who happens to be speaking at the time. For satellite communication, delays of the order of several hundreds of milliseconds are involved and the echo makes conversation almost impossible.

Until now, it has been found impossible to maintain reasonable balance of hybrids at all times and so echo suppressors are used to combat the problem. Some suppressors act as a one-way switch and this allows one subscriber to 'capture' the circuit. Whilst they reduce the problem of echo, such suppressors suffer from the practical disadvantage that double-talking is prevented. Other suppressors which allow limited double-talking have been proposed but these are found to be complex and expensive.

It is the primary object of the invention to provide an improved network in which acceptable balance conditions are achieved despite the presence of a variable admittance in the network.

Another more specific object is the provision of a hybrid network in which acceptable balance conditions are achieved despite variations of the admittance of the circuit connected to the bidirectional port such that an echo which exists is reduced in amplitude to an acceptable level.

In one form the invention provides a bridge network in which one arm includes a first signal generator, one arm includes both a first load impedance and a second signal generator, one arm includes a second load impedance, and an arm, including any one of the preceding arms, includes the output circuit of a device having an output signal which is characterized by a product of the signal from the first signal generator and the signal across the second load.

In the first form of the invention described above, the first signal generator may be the transmitter portion of a telephone headset. The arm including both the first load impedance and the second signal generator may be analogized to the transmission line coupled to another remotely located telephone hybrid set, the load representing the impedance of the line, and the signal generator representing the source of the current which is transmitted over that line during a communication exchange. The second load may be a resistor, or admittance (admittances are used in some of the circuit equasions further in the discussion) which is coupled to the output circuit of the hybrid and further represents an admittance associated with the bidirectional port. Finally the device which produces an output signal which is characterized by a product of the signal from the first signal generator and the signal across the second load is multiplication device which may include a simple multiplier circuit coupled serially with an amplifier to increase the gain thereof. The particular multiplication factor being determined of the balancing of the bridge network.

As will be described later, the device may also take the form of a variable attenuator. However, for purposes of explanation in the present form of the invention it is an amplifier and multiplier circuit as previously noted. The output signal from the device might be proportional to the product of the input and output signals of the bridge, or the product of the moduli of these signals, or the product of the input and output signals exponentiated to any arbitrary power, or any combination of these alternatives.

Hereinafter the devices unless otherwise described shall be referred to as amplifier multiplier circuits or simply multiplier circuits performing the function of combining the signals required, amplified by the characteristic transfer function of an amplifier.

The bridge network may take forms such as a Wheatstone bridge of six arms (including the detector and source), or modified Wheatstone bridges such as the hexagonal and octahedron forms, or an interconnection of several Wheatstone bridges. The well known transformer bridge or an interconnection of several such bridges may also be used, and in each case the output of the multiplier may be connected across any one of the several node pairs of the bridge.

In another form the invention provides an improved hybrid comprising a bridge network wherein one arm includes the output circuit of a multiplier having an output signal which is characterized by a product of the signal applied to the input port of the hybrid and the signal from the output port of the hybrid. More particularly the bridge network includes one arm which includes the input port, one arm which includes the output port, and one arm which includes the bidirectional port, said arm including said multiplier output being a separate arm or one of the above defined arms.

It is preferred that the multiplier output be included in an arm that is isolated from the bidirectional port arm since in such an arrangement the conductance looking into the bidirectional port can be made linear constant. The term 'isolated' is intended to indicate that the arm is connected such that the multiplier output does not flow in the arm including the bidirectional port.

It is also preferred that said multiplier output should be included in an arm that is isolated from all reactive arms of the bridge, since in such an arrangement voltage spikes which are characteristic of non-linear reactive circuits can be eliminated.

Accordingly, in a third form the invention provides a bridge network in which one arm includes a first signal generator, one arm includes both a second signal generator and a first load impedance, one arm includes an impedance which is nominally conjugate to the first load impedance and approximately balances the bridge, one arm includes a second load impedance, and a further arm, which is isolated from said arms including the first load impedance and nominal balancing impedance, and which includes the output circuit of an multiplier having an output signal which is characterized by a product of the signal from the first signal generator and the resulting signal across the second load.

In a fourth form the invention provides an improved hybrid including a bridge network comprising at least two bridge networks in cascade, one bridge having arms which include the input and bidirectional ports of the hybrid and the nominal balancing impedance, the other bridge network having arms which include the output port of the hybrid and the output circuit of an multiplier having an output signal characterized by a product of the signal applied to the input port of the hybrid and the signal from the output port of the hybrid.

In the third and fourth above-defined forms of the invention, said arm including said multiplier output circuit should be isolated from said second load impedance and from all reactive arms of the bridge. Such isolation can be achieved by having the multiplier output circuit in an arm of the bridge that is conjugate to the arm including both the second signal generator and first load (bidirectional port), and also conjugate to the arm including the nominal balancing impedance, and by having other appropriate arms resistive. For example, in the fourth form of the invention, these conditions obtain if the second sub-bridge has four appropriate arms resistive and equal.

The multiplier output signal in the second through fourth forms of the invention may be any of the alternatives described in connection with the first form.

In a fifth form the invention provides a bridge network in which one arm includes a first signal generator, one arm includes both a second signal generator and a first load impedance, one arm includes an impedance which is nominally conjugate to the first load impedance and approximately balances the bridge, and a further arm which includes the input circuit of a continuously variable attenuator with its output connected to a second load impedance; this attenuator has its loss controlled by the first signal generator.

In a sixth form the invention provides an improved hybrid including a bridge network, having arms which include the input and bidirectional ports of the hybrid and the nominal balancing impedance, and a further arm which includes the input circuit of a continuously variable attenuator with its output connected to the output port of the hybrid; this attenuator has its loss controlled by the signal applied to the input port of the hybrid.

The bridge networks and sub-bridge networks in the second through sixth forms of the invention may take any of the forms described in connection with the first form.

Several preferred embodiments of the various forms of the invention will now be described with reference to the accompanying drawings in which.

In the first embodiment to be described the improved hybrid employs a Wheatstone bridge of six arms. However, as is made clear above, this should not be construed as limiting since many other bridge networks may be satisfactorily used.

Figure 1:
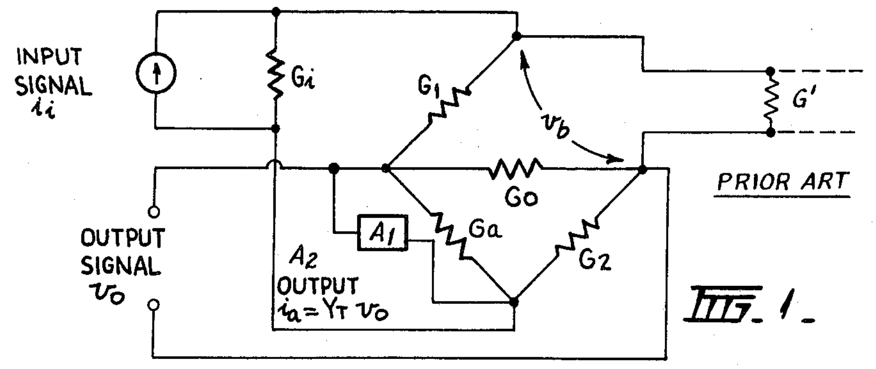
FIG. 1 is a generalized circuit diagram of the linear actively balanced bridge of Lampard and Stuart which is utilized in the bridge according to the invention.

To understand the operation of the improved hybrid, it is desirable first to understand the Lampard and Stuart bridge which is diagrammatically shown in FIG. 1 Reference is made to the September 1963 issue of the "I.E.E.E. Transactions on Circuit Therory" CT-10, pages 357 to 362, for a full discussion of this linear actively balanced bridge, in which a balancing amplifier A1 generates an output depending on the bridge output voltage $v_o$ alone. That is $i_a = Y_T v_o$, where $Y$ is the transfer admittance of the amplifier A1. Consideration of this reference will show that when signal $i_i$ is applied a signal $v_b$ appears across $G'$. Also if $Y_T$ approaches infinity then by the feedback action of the amplifier the bridge output $v_o$ is forced to be vanishingly small, independent of the value of $G'$. Thus, if this bridge were used as a hybrid with $G'$ representing the conductance of the network applied to the bidirectional port, the above two results show that both requirements (a) and (b) of a balanced hybrid would be satisfied by this network. However, requirement (c) cannot be satisfied while requirement (b) is also satisfied since if a signal were to be applied across $G'$ then the feedback action of the amplifier Al makes the output voltage $v_o$ vanishingly small for $Y_T$ very large. This means that a signal applied to the bidirectional port would not flow out the output so the bridge would not be useful as a hybrid.

Figure 2:
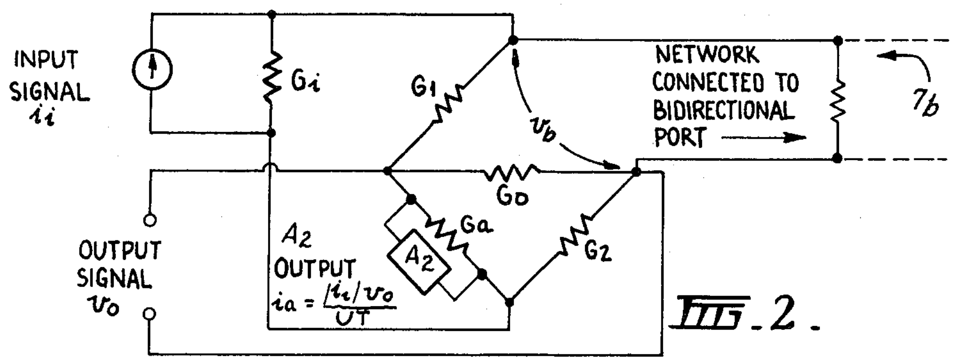
FIG. 2 is a generalized circuit diagram of a hybrid employing a bridge circuit according to the present invention.

A first embodiment of the improved hybrid is diagrammatically represented by FIG. 2 and in this Figure:

- Current generator or amplifier $A_i$ produces an input signal $i_i$ representing the signal source connected to the input port;
- Conductance $G_i$ includes the output conductance of the source;
- Voltage $v_o$ represents the signal output from the output port;
- Conductance $G_o$ includes any load connected to the output port;
- Current generator amplifier $A_b$ produces a current output $i_b$ representing the signal applied to the bidirectional port;
- Conductance G' represents the conductance of the two wire network connected to the bidirectional port. (G' is arbitrary).
- Voltage $v_b$ is the voltage appearing across the bidirectional port;
- Current $i_a$ represents the output signal of an multiplier $A_i$, and
- Conductance $G_a$ includes the output conductance of the multiplier The output signal of the multiplier $A_2$ is defined by $$i_a = |i_i|\ v_o/U_T \qquad (1)$$

where $U_T$ is a constant of proportionality that relates the output of the multiplier to a product between the signals at the input and output ports of the hybrid.

It will be appreciated that, because the amplifier $A_i$ output is proportional to a product between the signals at the input and output ports, the improved hybrid shown diagramatically in FIG. 2 belongs to the class of non-linear electrical networks.

Figure 3:
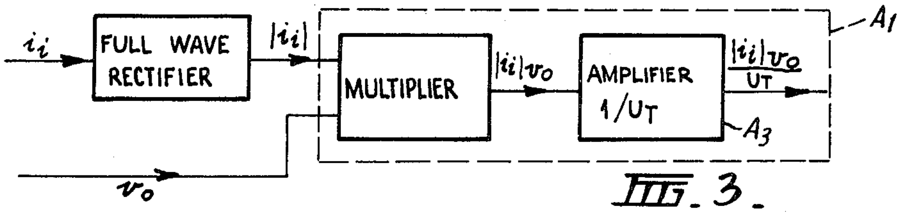
FIG. 3 is a generalized block diagram indicating one manner of deriving the required signal product.

FIG. 3 shows schematically how the signal represented by the above equation may be derived. The input signal $i_i$ to the hybrid is applied to a full-wave rectifier at A—A' (see FIG. 2) which yields a new signal $|i_i|$ at B—B'. This new signal and the output signal of the hybrid are then applied to the two input ports of a multiplier which yields the product $|i_i|\,v_o$ as shown. This product is then applied to an *1/A3 having a transfer constant* $1/U_T$ so that the output signal from the amplifier is as defined by equation 1. This amplifier A3 output and other outputs involving various products of input and output signals could be derived from many different forms of suitable apparatus. For example it will be appreciated that in a practical arrangement the required gain would be obtained directly from the multiplier circuit and no separate amplifier need be employed. The device enclosed within the dotted lines shown in FIG. 3 is similar to the multiplier unit 42 shown in FIG. 2 and as previously described since the function thereof is to provide an output signal which is characterized by the product of the input signal to the bridge, and the signal across the load and further amplified by the transfer characteristic of the amplifier A3.

Referring again to FIG. 2, consideration of this network will show that the undesired characteristic of the Lampard and Stuart bridge preventing requirement (c) being satisfied is removed in accordance with this embodiment by reducing the effective transfer emittance of the amplifier $A_2$ to zero when the input signal $i_i$ is not present. Equation (1) can be rearranged to express this admittance as $$Y_T\,(\text{effective}) = i_a/v_o = |i_i|/U_T \qquad (2)$$

Thus $Y_T$ (effective) is zero when $i_i$ is zero.

In a practical realization of the hybrid, five of the six arms may be made of the same conductance G with the arm defining the bidirectional port A-B still arbitrary G'. In such an arrangement it can be shown that $$v_b = i_i\,[1/2(G+G')] + i_b\,[1/G+G'] \qquad (3)$$

$$v_o = [i_i/G+|i_i|/4U_T]\,[\,G-G'/8(G+G')\,] + [i_b/G+|i_i|/4U_T]\,[\,G/2(G+G')\,] \qquad (4)$$

It will be evident that the following results are realized:

1. Equation (3) shows that the signal $v_b$ flowing out of the bidirectional port contains a term proportional to the input signal $i_i$ so requirement (a) of a balanced hybrid is satisfied.

2. If the output of Amplifier $A_b$ ($i_b$) is zero, Equation (4) reduces to $$v_o = [i_i/G+|i_i|/4U_T]\,[\,G-G'/8(G+G')\,] \qquad (5)$$

Evidently the output signal $v_o$ input can be made arbitrarily small in response to a finite input $i_i$ by reducing $U_T$, that is, by increasing the gain of the multiplier circuit $A_2$. The magnitude of the gain should be such that $1/U_T$ is more than about 10 times greater than $4G/|i_i(\text{maximum})|$. In the limit, a signal $i_i$ applied to the input port does not appear at the output port, and requirement (b) for a balanced hybrid is satisfied. 3. If $i_i$ is zero, Equation (4) reduces to $$v_o = i_b\,[\,1/2(G+G')\,] \qquad (6)$$

Thus a signal applied to the A–B– flows out from the output port, satisfying requirement (c) for a balanced hybrid.

4. For this particular configuration of the improved hybrid, the bridge having five equal arms and the multiplier $A_2$ output in the arm conjugate B'–A' to the bidirectional port A–B, Equation (3) shows that the conductance looking into the bidirectional port is linear and constant at $G$.

5. If neither $i_i$ nor $i_b$ is zero, the output signal $v_b$ contains the small undesired echo term defined by Equation (5) and the desired term due to $i_b$, namely, $$[\,i_b/G+|i_i|/4U_T]\,[\,G/2(G+G')\,]$$

The presence of $|i_i|$ in the denominator shows that the desired term due to $i_b$ is intermodulated by input signal $i_i$, that is, it is distorted. However, the zero crossings of the above term are the zero crossings of $i_b$. It is well-known that a speech waveform, even if severely distorted, remains intelligible if its zero crossings are unchanged. Therefore, the output signal from the self-balancing hybrid is intelligible and "double-talking" is possible. It will be appreciated that the intermodulation distortion is increased by increasing the gain of the multiplier circuit (reduction of $U_T$); $U_T$ should therefore be chosen only as small as is necessary to achieve acceptable balance and thus echo suppression.

All these results hold, independent of the admittance of G′ connected to the bidirectional port A–B. The general forms of results (1), (2), (3) and (5) hold if the five arms are not of equal conductance so that all three requirements of a balanced hybrid are still satisfied.

Tests have been carried out using a system embodying the generalized features of the hybrid network shown in FIG. 2 and it was found that the amplitude of the echo was reduced by factors of twenty and higher such that the affect on conversations involving large propagation times was found to be negligible.

In the preferred embodiment of the invention described above, all arms of the bridge are conductive. When the load presented to the bidirectional port is a complex admittance of nominal value Y and actual value Y′, then the conjugate arm of the bridge would be changed to $G^2/Y$ in order to restore approximate balance of echo. If the multiplier output $A_2$ is included in one arm of the bridge, large voltage spikes appear at the output port and the unwanted echo can actually be increased rather than reduced; these spikes are due to circulating currents which are changing the stored energy and are a characteristic of circuits that are both non-linear and reactive.

Figure 4:
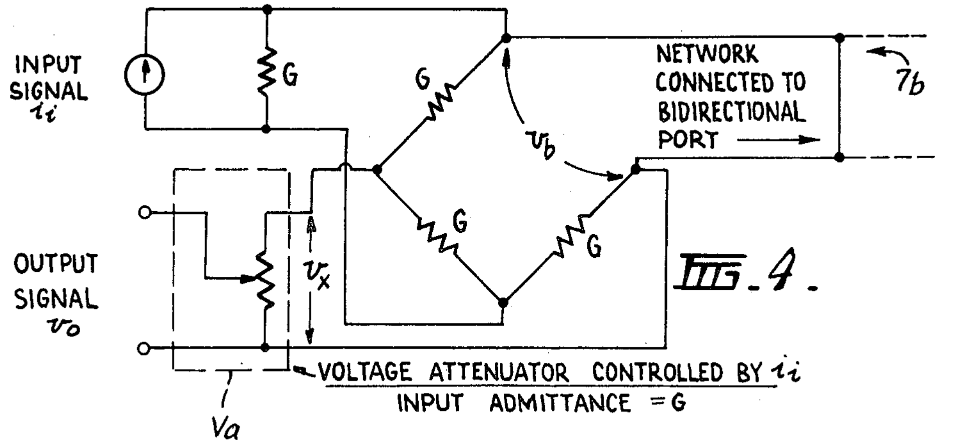
FIG. 4 is a circuit diagram of an alternative self-balancing hybrid.

The hybrid circuit of FIG. 4 differs from the hybrid of FIG. 2 in that the multiplier A1 is omitted and that the output signal $v_o$ is derived from a voltage attenuator $V_a$ connected to the detector terminals of the bridge. The attenuator $V_a$ has an input admittance of G and the ratio of output voltage to input voltage $[v_o/v_x]$ is represented by $1/(1 + |i_i|/J_T)$ where $J_T$ is a transfer constant of the attenuator. The equations describing FIGS. 2 and 4 are similar in form.

In this arrangement the bridge network is linear so that, even if the load impedance connected to the bidirectional port is reactive, the above mentioned voltage spikes do not appear.

Many suitable forms of variable attenuator could be devised by persons skilled in the art. Examples are a thermistor network or active bridge network for which the loss is continuously variable, and an electrically-switched resistor network for which the loss is variable in a number of discrete but closely-spaced steps and approximates to being continuously variable.

Figure 5:
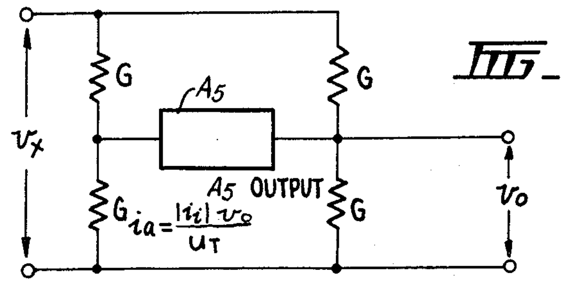
FIG. 5 is a circuit diagram of one form of attenuator network which can be used in the network of FIG. 4.

One preferred form of attenuator is shown in FIG. 5 to comprise a balanced Wheatstone bridge including the output circuit of a multiplier $A_5$ in the arm normally occupied by the detector. The multiplier output is $$i_a = |i_i|\ v_o/U_T$$

where $U_T$ is a transfer constant of the multiplier $A_5$. Voltages $v_o$ and $v_x$ are derived from the indicated arms of the bridge.

Figure 6:
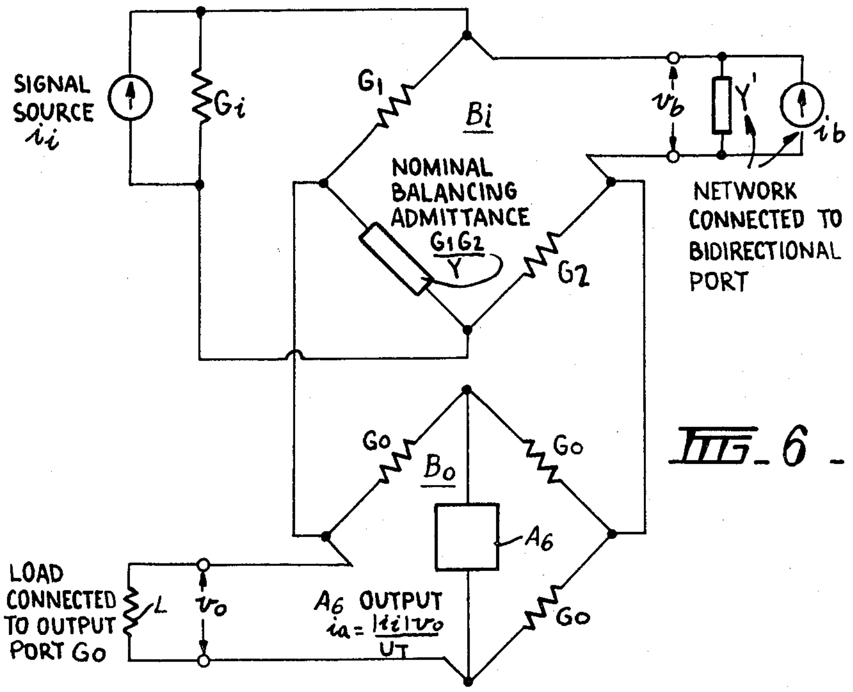
FIG. 6 is the circuit diagram of the combination of FIGS. 4 and 5.

The combined circuit is shown in FIG. 6 and it is to be appreciated that there is shown a cascaded pair of Wheatstone's bridges $B_i$ constituting a bridge circuit itself. Since the Bridge $B_o$ constitutes an attenuator this embodiment falls within the scope of the first, fifth and sixth form disclosed. Furthermore, since the pair of bridges constitutes a bridge circuit itself, this embodiment would also fall within the scope of the first and second forms disclosed. It will be evident that this bridge circuit $B_i$–$B_o$ the pair produces similar equations to those described in FIG. 2, so that the bridge is self-balancing to the same extent as the simple bridge disclosed above. For example bridge $B_o$ may be analogized to attenuator $B_a$ shown in FIG. 4 or output port B—B′ of FIG. 2. This is not to say they are identical but merely that they serve a similar purpose that is isolation of the input from the output. In this case however, a non-linear multiplier output signal does not appear at the port including Load L of the output resistive bridge $B_o$ (as amplifier A2 in FIG. 2) multiplier output $A_{bo}$ which is connected to the reactive bridge $B_i$ contains the bidirectional port and the nominal balancing impedance $G_aG_2/y$, said non-linear output of the multiplier $A_b$ is isolated from said reactive bridge $B_i$. Accordingly, since neither of the bridges is simultaneously non-linear and reactive, the voltage spikes discussed above are not present. This embodiment of the invention therefore falls within the scope of the third and fourth form disclosed.

The circuit shown in FIG. 4 may be thought to bear some resemblance to the well known echo suppressor. However, the following features distinguish it quite clearly:

1. In the self-balancing hybrid herein the controlled attenuator $V_a$ in the output path is continuously variable; in the echo suppressor it is an on-off switch.
11. In the self-balancing hybrid the control signal to the attenuator $V_a$ is the instantaneous input signal $|i_i|$; in the echo suppressor it is the time average of $|i_i|$ taken over several periods of the speech waveform.

In combination these two differences make "double-talking" possible with the self-balancing hybrid, where "double-talking" is not possible with the echo suppressor.

In some circumstances it may be advantageous to use the time average of $|i_i|$ as one input to the multiplier of the embodiments of FIGS. 2 and 6 or as the signal to the attenuator of FIG. 4. At the zero crossings of the $i_i$ waveform, the multiplier A4 output is zero and the attenuator $V_a$ is set to minimum loss. In either case there is no echo suppression at all. When all admittances in the hybrid are pure conductance, the zero crossings of $i_i$ coincide with the zero crossings of the echo $v_o$. Thus, echo suppression ceases only at instants when there is no echo to suppress. However, when complex admittances are included in the hybrid, the zero-crossings of $i_i$ may not coincide with the zero-crossings of $v_o$ and echo can become objectionable.

If a time average of $|i_i|$ is used as the control signal and the averaging period is of the order of one speech waveform period, the multiplier $A_b$ output not zero and the attenuator $V_a$ is not set to minimum loss at the zero-crossings of $i_i$, and the objectionable echo is reduced. The price paid is some degradation of the performance under "double-talk" conditions.

In a still further form the invention there is provided a network in accordance with any one of the forms of the invention defined above wherein a control signal $|i_i|$ which is an input multiplier $A_i$ or attenuator is time averaged over a short period, for example, of the order of one speech waveform.

One way of introducing this time averaging would be by means of a filter (such as a shunt capacitor) at a full wave output of the rectifier (not shown) included in amplifier A7 which is used to derive $|i_i|$ from $i_i$.

Another method might be to use some device with an inherent time lag as a variable arm of the bridge or attenuator — for example, a thermistor.

It is known to use time averaged signals in echo suppressors but the period in such instances is usually more than ten speech waveform periods.

Figure 7:
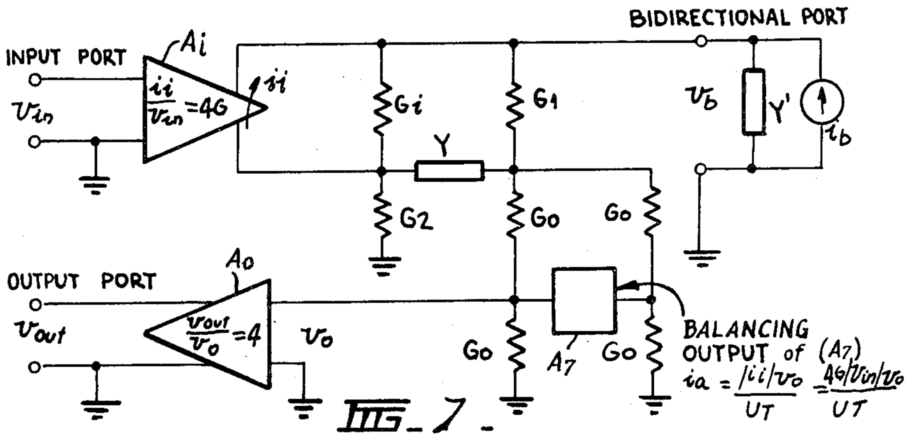
FIG. 7 is a block diagram of a particularly preferred practical implementation of the invention in the form of a telephone hybrid.

FIG. 7 shows a block diagram of a practical implementation of the invention in the form of a telephone hybrid. This implementation is based on FIG. 6 which falls within the scope of all six disclosed forms of the invention. Admittances $G_1$; $G_2$; $G_1 G_2 /|Y|$ and $Y'$ corresponds to Four arms of the bridge $B_i$ in FIG. 6 and the four conductances $G_o$ correspond to the Four arms of the bridge $B_o$. The following additional elements simplify the design of a practical hybrid:

1. A buffer amplifier $A_i$ is provided at the input port, for supplying the current drive $i_i$ and for partially making up the inherent loss of the network.
2. A buffer amplifier $A_o$ is provided at the output port, for making up the remaining loss of the network.
3. A ground point is provided shown symbolically, so that signal voltages at the ports are specified relative to ground datum.

If it is not desired that voltages should have ground datum, differential amplifiers might be used, or balanced-to-unbalanced transformer might be included at the ports. Alternatively, the whole network might be realized as a transformer bridge.

It is convenient to set all conductive arms of the bridge equal to $G$:

$$G_i = G_o = G_1 = G_2 = G$$

where $G$ is the nominal value of the admittance connected to the bidirectional port at some frequency near the middle of the voice-frequency band; 0.0012 mho would be a suitable value. It is also convenient to set the gains of the input and output amplifiers as $$i_i/v_{in} = 4\,G,$$

$$v_{out}/v_o = 4,$$

for the loss in the hybrid is then zero for the special case of $Y = Y' = G$. The equations for the hybrid are:

$$v_b = v_{in}\,[\,2G/G+Y'\,] + i_b\,[\,1/G+Y'\,]$$

$$v_{out} = [\,v_{in}/1+2\,|v_{in}|/U_T]\,[2G\,(Y-Y')/(G+Y)\,(G+Y')\,] + [i_b/1+2\,|v_{in}|/U_T]\,[1/G+Y']$$

when the multiplier output is $$i_a = (\,|i_i|\,v_o/U_T) = (4\,G\,|v_{in}|\,v_o)/U_T$$

In the detailed design of the input amplifier and multiplier circuits use could be made of the fact that a d.c. supply constitutes a signal ground. The quiescent currents for the amplifier can therefore be supplied in part via the arms of the bridge.

Figure 8:
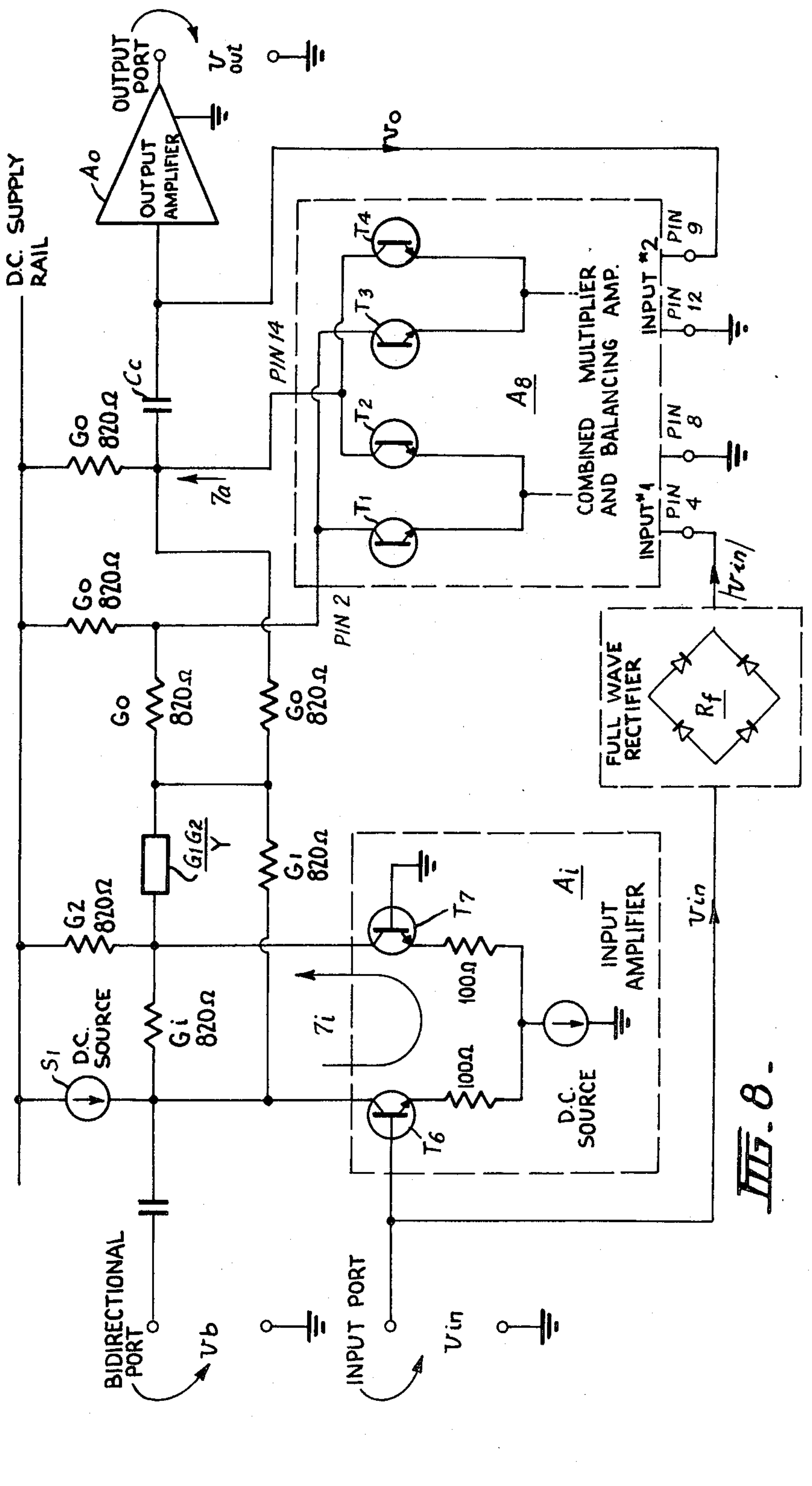
FIG. 8 is a more detailed circuit diagram of the hybrid indicating suitable resistance values.

FIG. 8 shows in outline suitable circuits:

The amplifier and multiplier $A_8$ may be separate as described in FIG. 3, however, for cases for ease of manufacture the combined form is usually more convenient. The multiplier in FIG. 3 has two inputs, one for the full wave rectifier and the other coupled to the output voltage $V_o$. Similarly in FIG. 8 full wave rectifier $R_f$ drives the bases of a transistors $T_1$ and $T_2$ while $B_o$ is amplified and multiplied by transistors $T_3$ and $T_4$.

As was suggested above in relation to the embodiment of FIG. 2, the value of the multiplier $A_b$ transfer constant must be a compromise. For a telephone hybrid in which signal peaks at the bidirectional port are of the order of 1 V, a suitable balancing amplifier gain is of the order of $U_T = 0.1$ V.

The circuit in FIG. 8 is shown to provide an example of component values which might be used to implement the present invention.

While there has been described, what at present is considered to be the preferred embodiment of the present invention, it will be obvious to those skilled in the art, that various changes and modifications may be made herein, without departing from the invention, and it is therefore aimed in the appended claims, to cover all such changes and modifications as fall within the true spirit and scope of the invention.

I claim:

1. A bridge network in which a first arm includes a first signal generator, a second arm includes both a first load impedance and a second signal generator, a third arm includes a second load impedance, and a fourth arm includes a third signal generator having an output signal which is characterized by a product between the signal from said first signal generator and the signal across said second load impedance.

2. The bridge network according to claim 1, wherein said third signal generator includes a multiplying circuit for obtaining said signal product.

3. An improved hybrid comprising a bridge network according to claim 2, wherein said first arm includes the input port, said second arm includes a bidirectional port, and said third arm includes the output port.

4. The improved hybrid according to claim 3, wherein the impedance of one arm of said bridge network is so chosen as to approximately balance the hybrid.

5. The improved hybrid of claim 3 wherein said third signal generator is connected in an arm of said bridge network and wherein said bridge network is balanced such that the output signal from said third signal generator does not flow in said bidirectional port.

6. The improved hybrid according to claim 3 wherein said third signal generator is connected in an arm of said bridge network and wherein said bridge network is balanced such that the output from said third signal generator does not flow in any arm in which the peak energy stored is greater than one tenth of the energy dissipated per cycle at a signal frequency of the first signal generator.

7. The hybrid network according to claim 3 wherein the output of said third signal generator is defined by $i_a = i_i\,v_o/U_T$ wherein $i_i$ is the signal presented to the input port, $v_o$ represents the signal of the output port and $U_T$ is the transfer constant of said multiplying circuit; said bridge circuit comprising a Wheatstone bridge of six arms, such that the voltage signal at the bidirectional port is represented by the expression:

$$i_i\,[\,1/2(G+G')\,] + i_b\,[\,1/G+G'\,]$$

wherein $i_b$ is the signal applied to the bidirectional port, G is the conductance of five of the six arms and $G'$ is the arbitrary conductance of the bidirectional port; the voltage signal at the output port being represented by the expression:

$[\, i_i/G+|i_i|/4U_T\,][\, G-G'/8(G+G')\,]+[\, i_b/G+|i_i|/4U_T\,][\, G/2(G+G')\,]$

8. The improved hybrid according to claim 7 wherein the bridge network comprises at least two bridge networks coupled from an input of one to an output of the other, one bridge network having arms which include the input and bidirectional ports of the hybrid and the balancing impedance, the other bridge network having arms which include the output port of the hybrid and said third signal generator.

9. The improved hybrid of claim 8 wherein said third signal generator is connected in an arm of said bridge network for which said bridge network is so balanced that the output signal from said third signal generator does not flow in said bidirectional port.

10. The improved hybrid according to claim 8 wherein said third signal generator is connected in an arm of said bridge network for which said bridge network is so balanced that the output signal from said third signal generator does not flow in any arm in which the peak energy stored is greater than one tenth of the energy dissipated per cycle at the signal frequency of the first signal generator.

11. The improved hybrid according to claim 8 wherein the other bridge has four appropriate arms constituted by resistive elements and is balanced so that the output signal of said third signal generator does not flow in the bidirectional port or in any arm in which the peak energy stored is greater than one tenth of the energy dissipated per cycle at the signal frequency of the first signal generator.

12. A bridge network in which a first arm includes a first signal generator, a second arm includes both a first load impedance and a second signal generator, and a third arm includes the input circuit of a continuously variable attenuator having its output connected to a second load impedance, said attenuator having its loss factor controlled by the signal from said first signal generator.

13. An improved hybrid comprising a bridge network according to claim 12 wherein said arm includes the input port, said second arm includes the bidirectional port, and said second load impedance includes the impedance connected to the output port.

14. The improved hybrid according to claim 13 wherein the impedance of one arm of the bridge network is so chosen as to approximately balance the hybrid.

15. The improved hybrid according to claim 13 wherein the ratio of output voltage to input voltage of the attenuator is represented by $1/1+|i_i|/J_T$ wherein $J_T$ is a transfer constant of the attenuator and $i_i$ is the signal presented to the input port.

16. The bridge network according to claim 2 wherein an input signal to the amplifier circuit is time averaged over a period of the order of one speech waveform.

17. The bridge network according to claim 12 wherein the control signal to the attenuator is time averaged over a period of the order of one speech waveform.

* * * * *